United States Patent
Zhao et al.

(10) Patent No.: US 11,734,954 B2
(45) Date of Patent: Aug. 22, 2023

(54) FACE RECOGNITION METHOD, DEVICE AND ELECTRONIC EQUIPMENT, AND COMPUTER NON-VOLATILE READABLE STORAGE MEDIUM

(71) Applicant: PING AN TECHNOLOGY (SHENZHEN) CO., LTD., Guangdong (CN)

(72) Inventors: Moyan Zhao, Guangdong (CN); Hongwei Wang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 356 days.

(21) Appl. No.: 17/266,587

(22) PCT Filed: Nov. 12, 2019

(86) PCT No.: PCT/CN2019/117656
§ 371 (c)(1),
(2) Date: Feb. 6, 2021

(87) PCT Pub. No.: WO2021/017286
PCT Pub. Date: Feb. 4, 2021

(65) Prior Publication Data
US 2021/0312163 A1  Oct. 7, 2021

(30) Foreign Application Priority Data
Aug. 1, 2019 (CN) .......................... 201910709169.7

(51) Int. Cl.
*G06V 40/16* (2022.01)
*G06V 10/75* (2022.01)

(52) U.S. Cl.
CPC .......... *G06V 40/171* (2022.01); *G06V 10/751* (2022.01); *G06V 40/172* (2022.01)

(58) Field of Classification Search
CPC ... G06V 10/751; G06V 40/171; G06V 40/172
See application file for complete search history.

(56) References Cited

U.S. PATENT DOCUMENTS

| | | | |
|---|---|---|---|
| 2011/0135165 A1* | 6/2011 | Wechsler | G06F 18/211 382/118 |
| 2020/0082157 A1* | 3/2020 | Susskind | G06V 40/18 |

OTHER PUBLICATIONS

Ejaz et al, "Implementation of Principal Component Analysis on Masked and Non-masked Face Recognition", IEEE, May 2019. (Year: 2019).*

* cited by examiner

*Primary Examiner* — Ruiping Li (57) ABSTRACT

A face recognition method includes: detecting keypoints when receiving a first face image; acquiring a recognition score of each detectable keypoint and serial numbers of missing keypoints; acquiring a plurality of target keypoints in the plurality of detectable keypoints having a predetermined face feature association relationship with the missing keypoints when the influence score is higher than a predetermined score threshold; acquiring a target face feature template having a degree of position combination with the plurality of target keypoints greater than a predetermined combination degree threshold; and stitching the target face feature template and the plurality of target keypoints on the first face image to obtain a second face image so as to detect all the keypoints according to the second face image for performing the face recognition.

15 Claims, 6 Drawing Sheets

FACE RECOGNITION METHOD, DEVICE AND ELECTRONIC EQUIPMENT, AND COMPUTER NON-VOLATILE READABLE STORAGE MEDIUM

CLAIM OF PRIORITY

This application claims priority to Chinese Patent Application No. 201910709169.7, filed on Aug. 1, 2019, and entitled "Face Recognition Method, Device, Storage Medium, and Electronic Equipment", the entire contents of which are incorporated herein by reference.

TECHNICAL FIELD

The invention relates to the technical field of face recognition, in particular to a face recognition method, device and electronic equipment, and a computer non-volatile readable storage medium.

BACKGROUND

Face recognition is a biological recognition technology based on human facial feature information.

At present, the recognition rate of the human face recognition is usually high enough in the normal evaluation environment of the complete human face. However, the recognition rate is evaluated in the normal environment. The inventor of the present application realizes that the recognition rate can be greatly reduced in some scenes where it is intentionally decorated with an incomplete human face image. That is, the collected incomplete human face image is usually not matched with a preset human face in a database, so that the human face recognition is completed.

SUMMARY

In order to solve the above-mentioned technical problem, it is an object of the present application to provide a face recognition method, device, electronic equipment, and computer non-volatile readable storage medium.

The technical solution adopted by the present application is as follows.

In a first aspect, a face recognition method includes: detecting all keypoints from a first face image to obtain a plurality of detectable keypoints and coordinates of each detectable keypoint when receiving the first face image with blocked partial face features; acquiring a recognition score of each detectable keypoint and serial numbers of missing keypoints from a preset keypoint information database based on each detectable keypoint; acquiring an influence score of an area with the blocked partial face features on the face recognition according to the recognition score of each detectable keypoint; acquiring a plurality of target keypoints in the plurality of detectable keypoints having a predetermined face feature association relationship with the missing keypoints based on the serial numbers of the missing keypoints when the influence score is higher than a predetermined score threshold; acquiring a target face feature template having a degree of position combination with the plurality of target keypoints greater than a predetermined combination degree threshold from a predetermined face feature template library according to the coordinates of the plurality of target keypoints; and stitching the target face feature template and the plurality of target keypoints on the first face image to obtain a second face image so as to detect all the keypoints according to the second face image for performing the face recognition.

In a second aspect, a face recognition apparatus includes: a detection module configured for detecting all keypoints from a first face image to obtain a plurality of detectable keypoints and coordinates of each detectable keypoint when receiving the first face image with blocked partial face features; a first acquisition module configured for acquiring a recognition score of each detectable keypoint and serial numbers of missing keypoints from a preset keypoint information database based on each detectable keypoint; a second acquisition module configured for acquiring an influence score of an area with the blocked partial face features on the face recognition according to the recognition score of each detectable keypoint; a third acquisition module configured for acquiring a plurality of target keypoints in the plurality of detectable keypoints having a predetermined face feature association relationship with the missing keypoints based on the serial numbers of the missing keypoints when the influence score is higher than a predetermined score threshold; a fourth acquisition module configured for acquiring a target face feature template having a degree of position combination with the plurality of target keypoints greater than a predetermined combination degree threshold from a predetermined face feature template library according to the coordinates of the plurality of target keypoints; and a stitching module configured for stitching the target face feature template and the plurality of target keypoints on the first face image to obtain a second face image so as to detect all the keypoints according to the second face image for performing the face recognition.

In a third aspect, an electronic equipment includes a processing unit; and a storage unit configured for storing a face recognition program of the processing unit; wherein the processing unit is configured for performing the method in the first aspect or any possible implementation of the first aspect via execution of the face recognition program.

In a fourth aspect, a computer non-volatile readable storage medium has stored thereon a face recognition program which, when executed by a processing unit, performs the method in the first aspect or any possible implementation of the first aspect.

According to the technical solution, when the face image is blocked, the features can be accurately supplemented to perform the face recognition efficiently and accurately.

It should be understood that both the foregoing general description and the following detailed description are exemplary and explanatory only and are not restrictive of the invention.

BRIEF DESCRIPTION OF THE ACCOMPANYING DRAWINGS

The accompanying drawings, which are incorporated in and constitute a part of this description, illustrate embodiments consistent with the present application and, together with the description, serve to explain the principles of the application.

From the figures, there have been shown specific embodiments of the present application, which will be described in more detail hereinafter. The drawings and description are not intended to limit the scope of the inventive concept in any way, but to illustrate the inventive concept for a person skilled in the art by reference to specific embodiments.

DETAILED DESCRIPTION OF ILLUSTRATED EMBODIMENTS

An explanation will now be made in detail to the exemplary embodiments, examples of which are illustrated in the accompanying drawings. When the following description refers to the accompanying drawings, like numerals in different drawings indicate the same or similar elements, unless otherwise indicated. The implementations described in the following exemplary embodiments do not represent all implementations consistent with the present application. Rather, they are merely examples of devices and methods consistent with some aspects of the application as detailed in the appended claims.

Exemplary implementations will now be described more fully with reference to the accompanying drawings. However, the example implementations can be implemented in a variety of forms and should not be construed as limited to the examples set forth herein; rather, these implementations are provided so that this application will be thorough and complete, and will fully convey the concept of example implementations to those skilled in the art. The described features, structures, or characteristics may be combined in any suitable manner in one or more embodiments.

Figure 1:
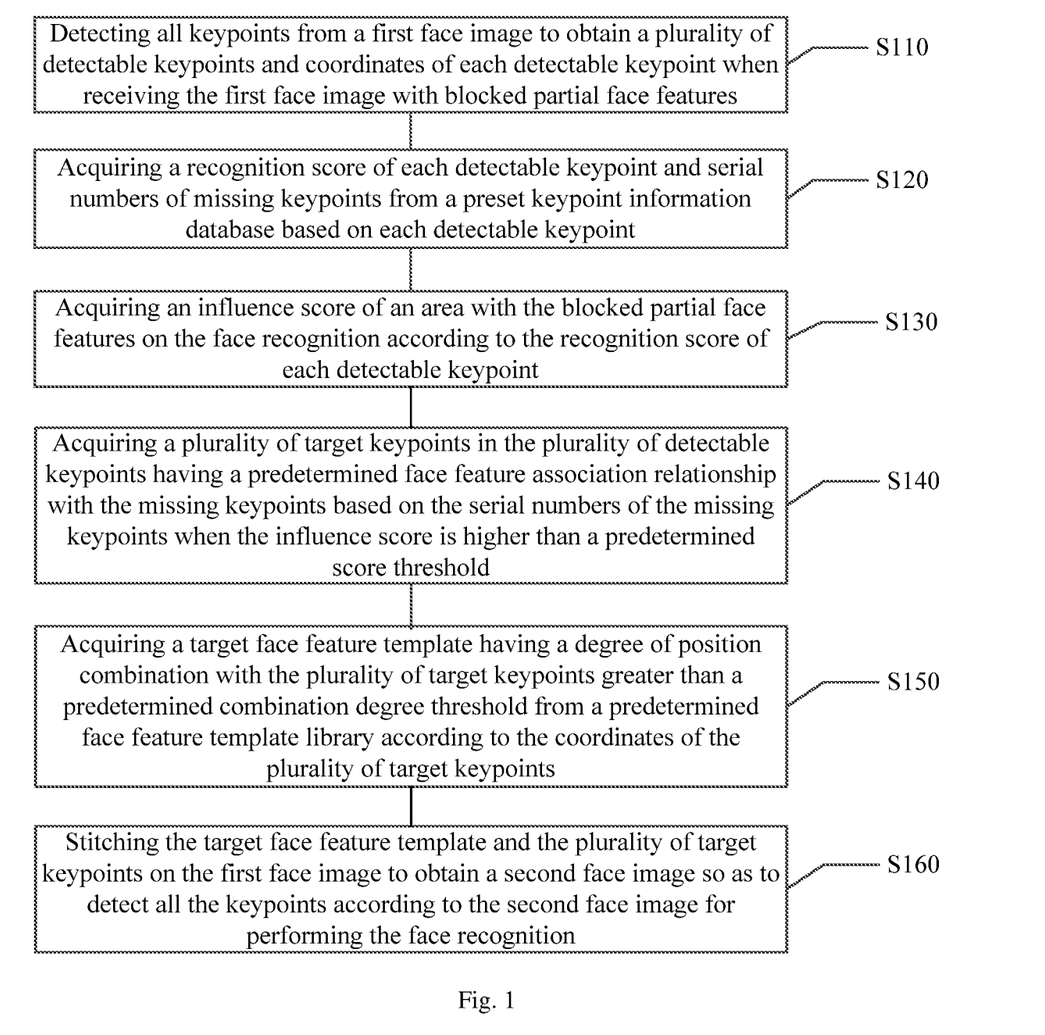
FIG. 1 schematically shows a flow chart of a face recognition method.

The example implementation firstly provides a face recognition method which can be operated on a server, and also can be operated on a server cluster, a cloud server and the like. However, a person skilled in the art could also operate the method of the present application on other platforms according to requirements, and this is not particularly limited in the exemplary embodiment. Referring to FIG. 1, the face recognition method may include the following steps: step S110, detecting all keypoints from a first face image to obtain a plurality of detectable keypoints and coordinates of each detectable keypoint when receiving the first face image with blocked partial face features; step S120, acquiring a recognition score of each detectable keypoint and serial numbers of missing keypoints from a preset keypoint information database based on each detectable keypoint; step S130, acquiring an influence score of an area with the blocked partial face features on the face recognition according to the recognition score of each detectable keypoint; step S140, acquiring a plurality of target keypoints in the plurality of detectable keypoints having a predetermined face feature association relationship with the missing keypoints based on the serial numbers of the missing keypoints when the influence score is higher than a predetermined score threshold; step S150, acquiring a target face feature template having a degree of position combination with the plurality of target keypoints greater than a predetermined combination degree threshold from a predetermined face feature template library according to the coordinates of the plurality of target keypoints; and step S160, stitching the target face feature template and the plurality of target keypoints on the first face image to obtain a second face image so as to detect all the keypoints according to the second face image for performing the face recognition.

Firstly, the face recognition method includes detecting all keypoints from a first face image to obtain a plurality of detectable keypoints and coordinates of each detectable keypoint when receiving the first face image with blocked partial face features. In this way. it is possible to detect detectable keypoints which are not blocked in the first face image having an area with blocked partial face features. Then, it includes acquiring a recognition score of each detectable keypoint and serial numbers of missing keypoints from a preset keypoint information database based on each detectable keypoint. Therefore, the recognition score of the influence of each detectable keypoint on the face recognition can be obtained so as to be used for accurately evaluating the recognizability of the blocked face; and meanwhile, the serial numbers of the missing keypoints on the first face image can be acquired for efficiently acquiring the position of the missing keypoints. Further, it includes acquiring an influence score of an area with the blocked partial face features on the face recognition according to the recognition score of each detectable keypoint; and acquiring a plurality of target keypoints in the plurality of detectable keypoints having a predetermined face feature association relationship with the missing keypoints based on the serial numbers of the missing keypoints when the influence score is higher than a predetermined score threshold. Therefore, the target keypoints on the same face feature associated with the missing keypoints can be obtained when the recognition influence of the missing keypoints on the first face image exceeds a limit value. Further, it includes acquiring a target face feature template having a degree of position combination with the plurality of target keypoints greater than a predetermined combination degree threshold from a predetermined face feature template library according to the coordinates of the plurality of target keypoints. Therefore, the target face feature template adapted to the blocked area can be accurately acquired by the degree of position combination with the plurality of target keypoints. Furthermore, it includes stitching the target face feature template and the plurality of target keypoints on the first face image to obtain a second face image so as to detect all the keypoints according to the second face image for performing the face recognition, so that when the face image is blocked, the features are accurately supplemented to perform the face recognition efficiently and accurately.

Hereinafter, steps of the above-described face recognition method in the exemplary implementation will be explained and described in detail with reference to the accompanying drawings.

Figure 2:
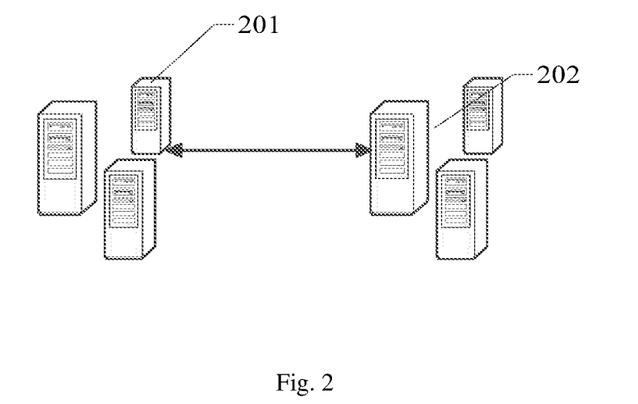
FIG. 2 schematically shows an application scenario example diagram of the face recognition method.

The step S110 includes detecting all keypoints from a first face image to obtain a plurality of detectable keypoints and coordinates of each detectable keypoint when receiving the first face image with blocked partial face features. In an implementation of the example, referring to FIG. 2, the server 201 detects all keypoints from a first face image to obtain a plurality of detectable keypoints and coordinates of each detectable keypoint when the server 201 receives the first face image with blocked partial face features transmitted by the server 202. This makes it possible, in a subsequent step, for the server 201 to analyze the influence of the area with the blocked partial face features in the first face image on the basis of the plurality of detectable keypoints and the coordinates of each detectable keypoint and to take corresponding recognition complementary measures. It will be appreciated that in a subsequent step, the server 202 may directly, with conditions permitting, detect all keypoints from the first face image to obtain a plurality of detectable keypoints and coordinates of each detectable keypoint, followed by a next step. Here, the server 201 may be any equipment having processing capabilities, such as a computer, a micro-processing unit, etc., not specifically limited thereto, and the server 202 may be any equipment having instruction transmission and data storage capabilities, such as a cell phone, a computer, etc., not specifically limited thereto. The first face image having an area with blocked partial face features is, for example, a face image where part of the eye part of the face is blocked. The first face image is obtained by extracting a face area from a picture including the face image by a coordinate frame based on face detection and scaling the face area to a fixed size. Therefore, a first face image with uniform size can be obtained, and further, position information such as coordinates and the like of keypoints on the face image can be accurately acquired. The detection of all the keypoints from the first face image is to locate a predetermined number of keypoints, such as eye corners, points on eye corner contours and the like, on the face such as eyes, mouth and nose contours on the first face image by using the existing face keypoint detection technology, and simultaneously obtain the coordinates of each keypoint. The plurality of detectable keypoints are keypoints which can be detected on the first face image having an area with blocked partial face features. When all the keypoints are detected, a plurality of detectable keypoints which are not blocked can be detected, and the coordinates of each detectable keypoint are obtained simultaneously. Thus, the information of the missing keypoints can be accurately acquired in the subsequent steps.

The step S120 includes acquiring a recognition score of each detectable keypoint and serial numbers of missing keypoints from a preset keypoint information database based on each detectable keypoint. In the implementation of the example, the preset keypoint information database stores recognition scores such as the serial number of each keypoint of all face keypoints and the contribution degree of each keypoint to face recognition during the face recognition.

The higher recognition score of the keypoint indicates that the keypoint is more important in the face recognition. For example, if the feature attention degree on an eye is high in a certain recognition rule, the recognition score of the keypoint on the eye is high; or some keypoints on the eye are more important, and the corresponding recognition score is higher. The missing keypoint is a keypoint except a detectable keypoint in all the keypoints predetermined to be detected on a face, namely a keypoint in an area with blocked partial face features. The recognition score of each detectable keypoint and the serial numbers of the missing keypoints can be accurately obtained by searching each detectable keypoint from a preset keypoint information database. Furthermore, the influence degree of the area with blocked partial face features on the face recognition can be accurately judged in a subsequent step.

According to an implementation of the example, the acquiring a recognition score of each detectable keypoint and serial numbers of missing keypoints from a preset keypoint information database based on each detectable keypoint includes sequentially searching each detectable keypoint from a preset keypoint information database to acquire a recognition score stored in association with each detectable keypoint; and taking other keypoints except the detectable keypoints in the preset keypoint information database as the missing keypoints. All keypoint information corresponding to a face images is stored in a preset keypoint information database, and recognition scores stored in association with each detectable keypoint can be accurately obtained by sequentially searching each detectable keypoint. Meanwhile, other keypoints except the detectable keypoints in a face image can be accurately and efficiently obtained to serve as the missing keypoints.

The step S130 includes acquiring an influence score of an area with the blocked partial face features on the face recognition according to the recognition score of each detectable keypoint. In an embodiment of the example, an influence score of a area with blocked partial face features on the face recognition is a score of the difficulty degree brought by the area with blocked partial face features on the face recognition when the human face recognition is performed. The higher the influence score is, the more difficult the face recognition is. The influence score may be obtained, for example, by summing the recognition scores for each detectable keypoint to obtain a recognition score sum, and then taking the reciprocal of the recognition score sum as the influence score. By acquiring the influence score, whether the first face image can be recognized can be accurately judged.

According to an implementation of the example, the acquiring an influence score of an area with the blocked partial face features on the face recognition according to the recognition score of each detectable keypoint includes summing the recognition scores of each detectable keypoint to obtain a recognition score sum; and subtracting a predetermined recognition score threshold from the recognition score sum to obtain a difference value between the recognition score sum and the predetermined recognition score threshold, and taking the difference value as an influence score of an area with the blocked partial face features on the recognized face. The subtracting a predetermined recognition score threshold for characterizing face recognizability from the recognition score sum yields a difference value between the recognition score sum and the predetermined recognition score threshold. If the difference value is a negative value, it indicates that the recognition is not possible; and a smaller negative value indicates that the recognition is more difficult. Therefore, based on the difference value, the influence score of the area with blocked partial face features on the face recognition can be accurately represented.

The step S140 includes acquiring a plurality of target keypoints in the plurality of detectable keypoints having a predetermined face feature association relationship with the missing keypoints based on the serial numbers of the missing keypoints when the influence score is higher than a predetermined score threshold. In an implementation of the example, the predetermined face feature association relationship is whether it is from the same feature on the face. If two keypoints are from the same face feature, it indicates that the two keypoints have the predetermined face feature association relationship, for example, a plurality of keypoints from the eyebrows have the predetermined face feature association relationship. The keypoints of each face are numbered in advance in sequence, and the keypoints of several serial numbers connected with missing keypoints can be accurately obtained by missing the serial numbers of the keypoints. Furthermore, according to the preset keypoint information database, a plurality of target keypoints in a plurality of detectable keypoints having a predetermined face feature association relationship with the missing keypoints can be accurately found according to the number records on the same face feature. When the influence score is higher than a predetermined score threshold, it indicates that the area with blocked partial face features causes the first face image to be incapable of performing the face recognition. By acquiring the plurality of target keypoints with the preset face feature association relationship with the missing keypoints, the positions of the missing keypoints can be judged according to the positions of the target keypoints, and then the missing keypoints are analyzed and calculated in a subsequent step to obtain the complementary features for the missing features.

Figure 3:
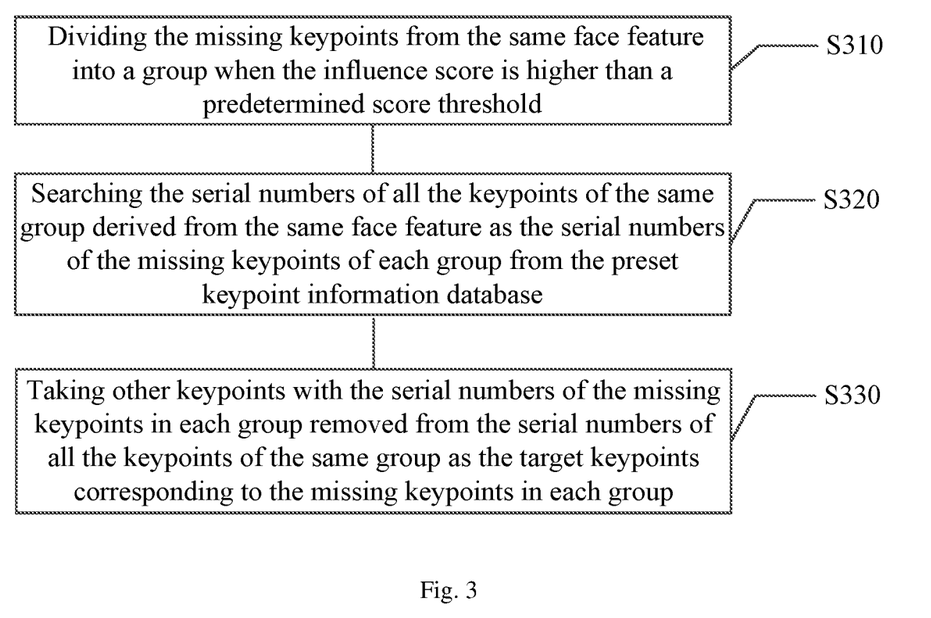
FIG. 3 schematically shows a flow chart of a method for acquiring a plurality of target keypoints for a predetermined face feature association relationship.

In an implementation of the example, referring to FIG. 3, the acquiring a plurality of target keypoints in the plurality of detectable keypoints having a predetermined face feature association relationship with the missing keypoints based on the serial numbers of the missing keypoints when the influence score is higher than a predetermined score threshold includes: step 310, dividing the missing keypoints derived from the same face feature into a group when the influence score is higher than a predetermined score threshold; step 320, searching the serial numbers of all the keypoints of the same group derived from the same face feature as the serial numbers of the missing keypoints of each group from the preset keypoint information database; and step 330, taking other keypoints with the serial numbers of the missing keypoints in each group removed from the serial numbers of all the keypoints of the same group as the target keypoints corresponding to the missing keypoints in each group. When the influence score is higher than the predetermined score threshold, namely when the influence of the missing keypoints on the face recognition is too much, the missing keypoints derived from the same face feature are divided into a group; and then the serial numbers of all the keypoints of the same group derived from the same face feature as the serial numbers of the missing keypoints of each group can be searched from the preset keypoint information database efficiently on the basis of grouping; after that, other keypoints with the serial numbers of the missing keypoints in each group can be accurately removed from the serial numbers of all the keypoints of the same group to serve as the target keypoints corresponding to the missing keypoints in each group. Therefore, the missing keypoints can be grouped first to obtain the target keypoints of each group, which is convenient for searching of the target keypoints and also management of the target keypoints, and accuracy and efficiency of analysis based on the missing keypoints in subsequent steps are guaranteed.

According to an implementation of the example, the acquiring a plurality of target keypoints in the plurality of detectable keypoints having a predetermined face feature association relationship with the missing keypoints based on the serial numbers of the missing keypoints when the influence score is higher than a predetermined score threshold includes: searching the serial numbers of all the keypoints derived from the same face feature as the serial numbers of each missing keypoint from the preset keypoint information database on the basis of the serial numbers of the missing key points when the influence score is higher than a predetermined score threshold; and acquiring a plurality of target keypoints with a preset face feature association relationship with each missing keypoint from the plurality of detectable keypoints according to the serial numbers of all the keypoints derived from the same face feature as the serial numbers of each missing keypoint. In this way, the serial numbers of all the keypoints derived from the same face feature corresponding to each keypoint can be accurately obtained by sequentially searching the serial numbers of all the keypoints from the same face feature as the serial numbers of each missing keypoint from the preset keypoint information database. Furthermore, a plurality of target keypoints having a preset face feature association relationship with each missing keypoint can be accurately acquired by searching the detectable keypoints from the serial numbers of all the keypoints derived from the same face feature as the serial number of each missing keypoint.

According to an implementation of the example, the acquiring a plurality of target keypoints from the plurality of detectable keypoints having a predetermined face feature association relationship with each missing keypoint according to the serial numbers of all the keypoints derived from the same face feature as the serial number of each missing keypoint includes: searching the serial numbers of all the keypoints derived from the same face feature as the serial number of each missing keypoint from the plurality of detectable keypoints to obtain the serial numbers of the searched detectable keypoints; and taking the detectable keypoints corresponding to the serial numbers of the searched detectable keypoints as a plurality of target keypoints having a predetermined face feature association relationship with each missing keypoint.

Therefore, the serial numbers of the detectable keypoints corresponding to each missing keypoint can be found by comparing the serial numbers of all the keypoints derived from the same face feature as the serial number of each missing keypoint on the basis of the numbers of all the detectable keypoints detected. Furthermore, the detectable keypoints corresponding to the serial numbers of the searched detectable keypoints are acquired as a plurality of target keypoints having a predetermined face feature association relationship with each missing keypoint.

In the step S150, acquiring a target face feature template having a degree of position combination with the plurality of target keypoints greater than a predetermined combination degree threshold from a predetermined face feature template library according to the coordinates of the plurality of target keypoints. In an implementation of the example, the predetermined face feature template library stores face feature templates of different sizes such as eyes and eyebrows of a person. From the coordinates of each target keypoint, the coordinates of several target keypoints derived from the same facial feature can be given, e.g. several target keypoints derived from the eyebrows of a person. Because the target keypoint is the keypoint of the remaining part of the face feature after being partially blocked, the distance between the target keypoints can be calculated by the coordinates of the target keypoints derived from the same face feature, and then the distance between the target keypoints and the keypoints calibrated on the face feature templates with different sizes stored in the predetermined face feature template library can be used for performing similarity calculation. The templates with the similarity exceeds a predetermined threshold may have a high degree of matching with the face features from which several sources of target keypoints are derived, i.e. the degree of position combination with the plurality of target keypoints is greater than the predetermined combination degree threshold. Thus, a target face feature template with the position combination degree of a plurality of target keypoints greater than a predetermined combination degree threshold can be acquired. In the subsequent step, the acquired target face feature template is used for the face recognition, so that the recognizability of a face image with an blocked area is effectively guaranteed.

According to an implementation of the example, the acquiring a target face feature template having a degree of position combination with the plurality of target keypoints greater than a predetermined combination degree threshold from a predetermined face feature template library according to the coordinates of the plurality of target keypoints includes: acquiring the coordinates of the plurality of target keypoints derived from the target human face feature according to the coordinates of each target keypoint; calculating a first distance between each two keypoints in the plurality of target keypoints according to the coordinates of the plurality of target keypoints derived from the target face feature; acquiring a second distance between every two keypoints of the plurality of preset keypoints having the same serial numbers as the plurality of target keypoints in a predetermined face feature template set corresponding to the target face feature from a predetermined face feature template library; calculating a degree of position combination of the plurality of target keypoints with each template in the predetermined face feature template set according to the first distance and the second distance; and taking a template having a degree of position combination with the plurality of target keypoints greater than a predetermined combination degree threshold from the predetermined face feature template set as the target face feature template.

The target face feature is a face feature such as an eye, a mouth, etc. to be analyzed. The coordinates of the plurality of target keypoints derived from the target face feature can be obtained by acquiring the coordinates of several target keypoints derived from the same target face feature in each target keypoint. Further, it includes calculating a first distance between each two keypoints in the plurality of target keypoints; meanwhile, acquiring a second distance between every two keypoints of the plurality of preset keypoints having the same serial numbers as the plurality of target keypoints in a predetermined face feature template set corresponding to the target face feature from a predetermined face feature template library. By the comparison of the difference values of the first distance and the second distance, the degree of position combination of a plurality of target keypoints in the target face feature with the corresponding numbered keypoints of each template in the predetermined face feature template set can be accurately calculated. Then, a template having a degree of position combination with the plurality of target keypoints on the target face feature greater than a predetermined combination degree threshold from a predetermined face feature template set can be used as a target face feature template for performing the face recognition in a subsequent step. The predetermined combination degree threshold is a threshold of a preset human face image combination degree representing a human face feature template; if the position combination degree is greater than the threshold, it indicates that it cannot be combined or the combination condition is poor; and if the position combination degree is less than the threshold number, it indicates that it can be combined well.

According to the first distance and the second distance, the method for calculating the degree of position combination of the plurality of target keypoints with each template in the predetermined face feature template set can be that the first distance and the second distance with the same serial numbers of the keypoints from which the first distance and the second distance are derived are performed with a differencing operation to obtain the sum of the difference values of all the first distances and the second distances as the position combination degree. Alternatively, the first distance and the second distance with the same serial numbers of the keypoints from which the first distance and the second distance are derived are performed with a differencing operation to obtain the difference value of the sum of the difference values of all the first distances and the second distances and the preset similarity threshold as the position combination degree.

Step S160, stitching the target face feature template and the plurality of target keypoints on the first face image to obtain a second face image so as to detect all the keypoints according to the second face image and then perform the face recognition.

In an implementation of the example, by moving the preset keypoints on the target face feature template to the positions of a plurality of target keypoints with the same serial numbers on the first face image, the target face feature template and the plurality of target keypoints on the first face image can be stitched to obtain a second face image. Furthermore, the keypoints of the second face image can be detected, the relative positions and sizes of representative parts (such as eyebrows, eyes, nose, mouth and the like) of the face and the face can be extracted as features, and the shape information of the face contour is used as features to perform the face recognition. Therefore, when partial features of the face image are missing, the face recognition is still performed efficiently and accurately to obtain the user identity.

Figure 4:
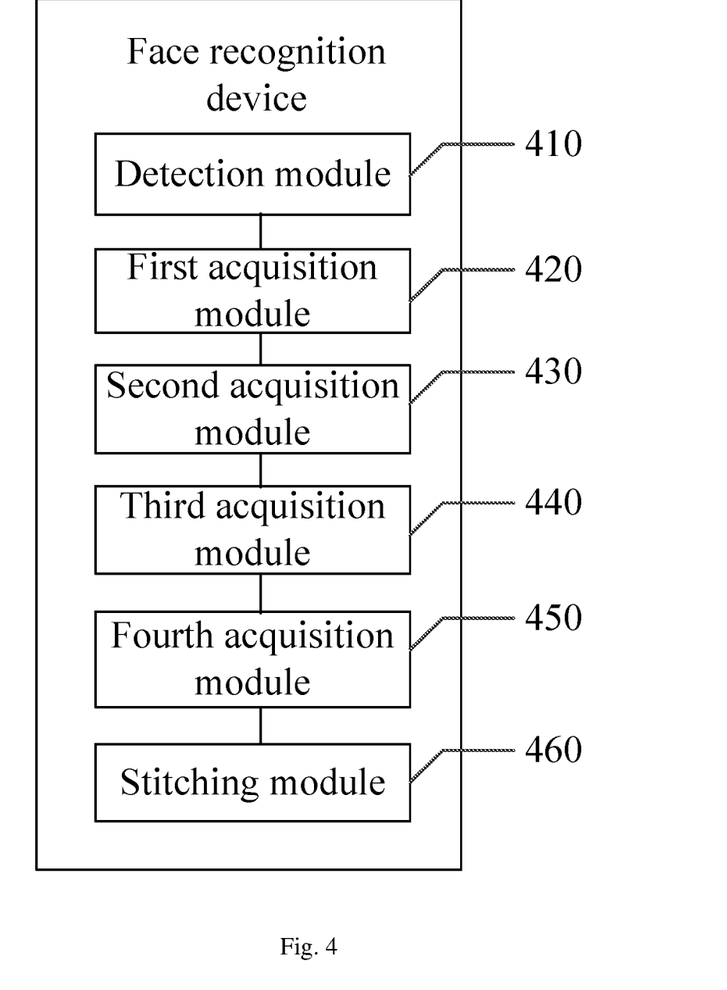
FIG. 4 schematically shows a block diagram of a face recognition device.

The invention also provides a face recognition device. Referring to FIG. 4, the face recognition device may include a detection module 410, a first acquisition module 420, a second acquisition module 430, a third acquisition module 440, a fourth acquisition module 450, and a stitching module 460. The detection module 410 is configured for detecting all keypoints from a first face image to obtain a plurality of detectable keypoints and coordinates of each detectable keypoint when receiving the first face image with blocked partial face features; the first acquisition module 420 is configured for acquiring a recognition score of each detectable keypoint and serial numbers of missing keypoints from a preset keypoint information database based on each detectable keypoint; the second acquisition module 430 is configured for acquiring an influence score of an area with the blocked partial face features on the face recognition according to the recognition score of each detectable keypoint; the third acquisition module 440 is configured for acquiring a plurality of target keypoints in the plurality of detectable keypoints having a predetermined face feature association relationship with the missing keypoints based on the serial numbers of the missing keypoints when the influence score is higher than a predetermined score threshold; the fourth acquisition module 450 is configured for acquiring a target face feature template having a degree of position combination with the plurality of target keypoints greater than a predetermined combination degree threshold from a predetermined face feature template library according to the coordinates of the plurality of target keypoints; and the stitching module 460 is configured for stitching the target face feature template and the plurality of target keypoints on the first face image to obtain a second face image so as to detect all the keypoints according to the second face image for performing the face recognition.

The specific details of each module in the above-described face recognition device have been described in detail in the corresponding face recognition method, and thus will not be described in detail herein.

It should be noted that although in the foregoing detailed description reference has been made to several modules or elements of an apparatus for action execution, such partitioning is not mandatory. Indeed, the features and functions of two or more modules or units described above may be embodied in one module or unit in accordance with implementations of the present application. Conversely, the features and functions of one module or unit described above may be further divided into embodiments by multiple modules or units. Furthermore, although the various steps of the methods of the present application are depicted in the drawings in a particular order, this does not require or imply that the steps must be performed in that particular order, or that all illustrated steps must be performed to achieve the desired result. Additionally or alternatively, certain steps may be omitted, multiple steps combined into one step execution, and/or one step divided into multiple steps, etc. From the above description of the embodiments, those skilled in the art will readily appreciate that the example implementations described herein may be implemented in software or in combination with the necessary hardware. Therefore, the technical solution according to the implementations of the present application may be embodied in the form of a software product, which may be stored in a non-volatile storage medium (which may be a CD-ROM, a U-disk, a mobile hard disk, etc.) or on a network, including instructions for causing a computing device (which may be a personal computer, a server, a mobile terminal, or a network device, etc.) to perform the method according to the implementations of the present application.

In an exemplary embodiment of the present application, an electronic equipment capable of implementing the above-mentioned method is also provided.

Those skilled in the art will appreciate that aspects of the present application may be implemented as a system, a method, or a program product. Accordingly, aspects of the present application may be embodied in the form of: a complete hardware implementation, a complete software implementation (including firmware, microcode, etc.), or an implementation combining the aspects of hardware and software, which may be referred to collectively herein as a "circuit", "module", or "system".

An electronic equipment 500 according to this embodiment of the present application is described below with reference to FIG. 5. The electronic equipment 500 shown in FIG. 5 is merely an example and should not impose any limitations on the functionality and scope of use of embodiments of the present application.

Figure 5:
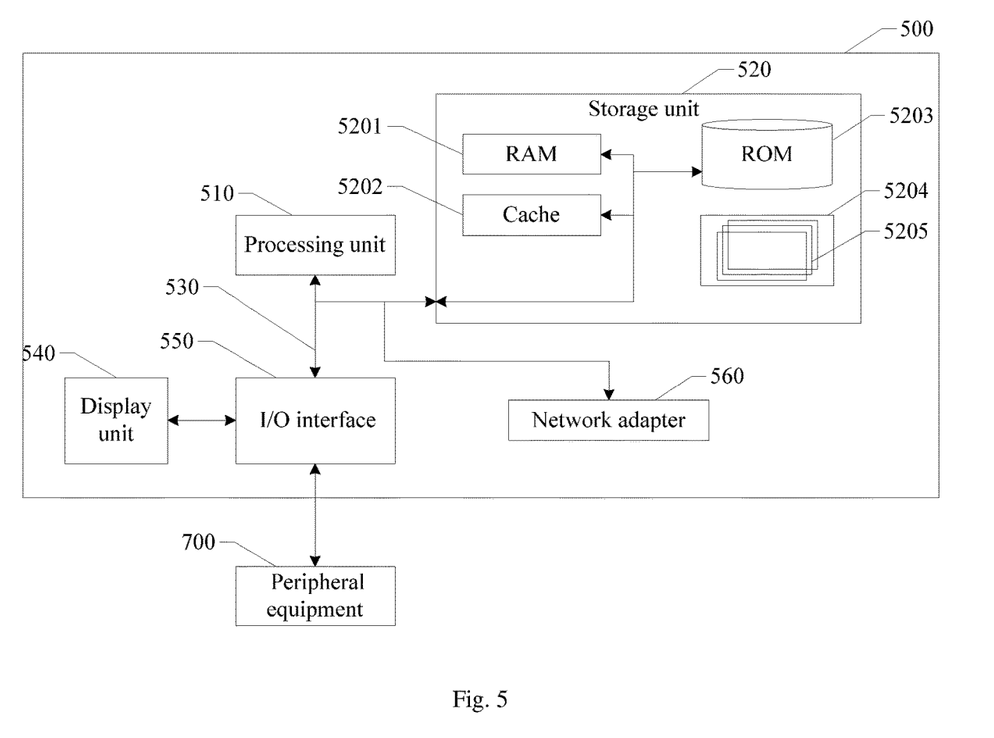
FIG. 5 shows a block diagram of electronic equipment for implementing the face recognition method according to an exemplary embodiment.

As shown in FIG. 5, the electronic equipment 500 takes the form of a general purpose computing device. Components of the electronic equipment 500 may include, but are not limited to the at least one processing unit 510, the at least one storage unit 520, and a bus 530 connecting different system components including the storage unit 520 and the processing unit 510.

The storage unit stores program code that can be executed by the processing unit 510 to cause the processing unit 510 to perform the steps according to various exemplary implementations of the present application described in the above-mentioned "Exemplary Methods" section of the present description. For example, the processing unit 510 may perform the steps as shown in FIG. 1: step S110, detecting all keypoints from a first face image to obtain a plurality of detectable keypoints and coordinates of each detectable keypoint when receiving the first face image with blocked partial face features; step S120, acquiring a recognition score of each detectable keypoint and serial numbers of missing keypoints from a preset keypoint information database based on each detectable keypoint; step S130, acquiring an influence score of an area with the blocked partial face features on the face recognition according to the recognition score of each detectable keypoint; step S140, acquiring a plurality of target keypoints in the plurality of detectable keypoints having a predetermined face feature association relationship with the missing keypoints based on the serial numbers of the missing keypoints when the influence score is higher than a predetermined score threshold; step S150, acquiring a target face feature template having a degree of position combination with the plurality of target keypoints greater than a predetermined combination degree threshold from a predetermined face feature template library according to the coordinates of the plurality of target keypoints; and step S160, stitching the target face feature template and the plurality of target keypoints on the first face image to obtain a second face image so as to detect all the keypoints according to the second face image for performing the face recognition.

The storage unit 520 may include a readable medium in the form of volatile storage units, such as a random access memory (RAM) unit 5201 and/or a cache storage unit 5202, and may further include a read-only memory unit (ROM) 5203.

The storage unit 520 may also include a program/utility 5204 having a set (at least one) of program modules 5205 including, but not limited to an operating system, one or more application programs, other program modules, and program data, and each or some combination of these examples may include an implementation of a network environment.

The bus 530 may represent one or more of several types of bus structures, including a storage unit bus or a storage unit controller, a peripheral bus, a graphics acceleration port, a processing unit, or a local bus using any of a variety of bus structures.

The electronic equipment 500 may also communicate with one or more peripheral equipment 700 (e.g., a keyboard, a pointing device, a Bluetooth device, etc.), one or more equipment that enable a customer to interact with the electronic equipment 500, and/or any equipment (e.g., a router, a modem, etc.) that enables the electronic equipment 500 to communicate with one or more other computing devices. This communication may be conducted by an input/output (I/O) interface 550. Also, the electronic equipment 500 may also communicate with one or more networks (e.g., a local area network (LAN), a wide area network (WAN), and/or a public network such as the Internet) via a network adapter 560. As shown, the network adapter 560 communicates with other modules of the electronic equipment 500 via the bus 530. It should be understood that other hardware and/or software modules can be used in conjunction with the electronic equipment 500, including but not limited to microcode, device drives, redundant processing units, external disk drive arrays, RAID systems, tape drives, and data backup storage systems.

From the above description of the embodiments, those skilled in the art will readily appreciate that the example implementations described herein may be implemented in software or in combination with the necessary hardware. Therefore, the technical solution according to the implementations of the present application may be embodied in the form of a software product, which may be stored in a non-volatile storage medium (which may be a CD-ROM, a U-disk, a mobile hard disk, etc.) or on a network, including instructions for causing a computing device (which may be a personal computer, a server, a terminal device, or a network device, etc.) to perform the method according to the implementations of the present application.

Figure 6:
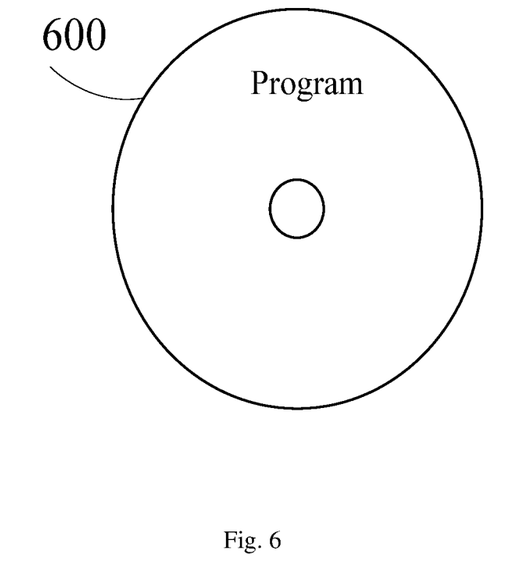
FIG. 6 shows a schematic diagram of a computer non-volatile readable storage medium for implementing the face recognition method according to an exemplary embodiment.

In an exemplary embodiment of the present application, referring to FIG. 6, there is also provided a computer readable storage medium having stored thereon a program product capable of implementing the methods described herein, which may be a computer non-volatile readable storage medium. In some possible embodiments, the aspects of the present application may also be implemented in the form of a program product including program code for causing a terminal device to perform the steps according to various exemplary implementations of the present application described in the above-mentioned "Exemplary Methods" section of the present specification when the program product runs on the terminal device.

Referring to FIG. 6, the program product 600 for implementing the above-mentioned method according to an implementation of the present application is described, which may employ a portable compact disc read only memory (CD-ROM) and include a program code, and may run on a terminal device such as a personal computer. However, the program product of the present application is not limited in this respect. In this document, a readable storage medium may be any tangible medium that contains or stores a program for use by or in connection with an instruction execution system, a device, or an apparatus. The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, device, or apparatus, or any combination thereof. More specific examples (a non-exhaustive list) of the readable storage medium include an electrical connection having one or more wires, a portable disk, a hard disk, a random access memory (RAM), a read only memory (ROM), an erasable programmable read only memory (EPROM or Flash memory), an optical fiber, a portable compact disk read only memory (CD-ROM), an optical storage device, a magnetic storage device, or any suitable combination thereof. The computer-readable signal medium may include a data signal propagating in a baseband or as part of a carrier wave, carrying readable program code thereon. Such propagated data signals may take many forms, including but not limited to electromagnetic signals, optical signals, or any suitable combination thereof. The readable signal medium may also be any readable medium other than the readable storage medium that can transmit, propagate, or transport the program for use by or in connection with the instruction execution system, device, or apparatus. The program code embodied on the readable medium may be transmitted over any suitable medium including, but not limited to, wireless, wired, fiber optic, RF, and other manners, or any suitable combination thereof. The program code for performing operations of the present application may be written in any combination of one or more programming languages, including object-oriented programming languages such as Java, C++, and the like, as well as conventional procedural programming languages such as the "C" language or similar programming languages. The program code may be executed entirely on the client computing device, partially on the client device, as a stand-alone software package, partially on the client computing device, partially on the remote computing device, or entirely on the remote computing device or server. In the case of a remote computing device, the remote computing device may be connected to the client computing device by any kind of network, including a local area network (LAN) or a wide area network (WAN), or may be connected to an external computing device (e.g., over the Internet using an Internet service provider). Further, the above-described drawings are only schematic illustrations of processes involved in a method according to exemplary embodiments of the present application, and are not intended to be limiting. It will be readily appreciated that the processes illustrated in the above figures do not illustrate or limit the temporal order of these processes. In addition, it will also be readily appreciated that these processes may be performed, for example, synchronously or asynchronously in multiple modules. Other embodiments of the invention will be apparent to those skilled in the art from consideration of the description and practice of the invention disclosed herein. This application is intended to cover any variations, uses, or adaptations of the application following the general principles of the application and including common general knowledge or customary technical means in the art not disclosed herein. It is intended that the description and the embodiments be considered as exemplary only, with a true scope and spirit of the application being indicated by the following claims.

What is claimed is:

1. A face recognition method, comprising:
    detecting all keypoints from a first face image to obtain a plurality of detectable keypoints and coordinates of each detectable keypoint when receiving the first face image with blocked partial face features;
    acquiring a recognition score of each detectable keypoint and serial numbers of missing keypoints from a preset keypoint information database based on each detectable keypoint;
    acquiring an influence score of an area with the blocked partial face features on the face recognition according to the recognition score of each detectable keypoint;
    acquiring a plurality of target keypoints in the plurality of detectable keypoints having a predetermined face feature association relationship with the missing keypoints based on the serial numbers of the missing keypoints when the influence score is higher than a predetermined score threshold;
    acquiring a target face feature template having a degree of position combination with the plurality of target keypoints greater than a predetermined combination degree threshold from a predetermined face feature template library according to the coordinates of the plurality of target keypoints; and
    stitching the target face feature template and the plurality of target keypoints on the first face image to obtain a second face image so as to detect all the keypoints according to the second face image for performing the face recognition.

2. The method according to claim 1, wherein the acquiring a recognition score of each detectable keypoint and serial numbers of missing keypoints from a preset keypoint information database based on each detectable keypoint comprises:
    sequentially searching each detectable keypoint from a preset keypoint information database to acquire a recognition score stored in association with each detectable keypoint; and
    taking other keypoints except the detectable keypoints in the preset keypoint information database as the missing keypoints.

3. The method according to claim 1, wherein the acquiring an influence score of an area with the blocked partial face features on the face recognition according to the recognition score of each detectable keypoint comprises:

summing the recognition scores of all the detectable keypoints to obtain a recognition score sum; and subtracting a predetermined recognition score threshold from the recognition score sum to obtain a difference value between the recognition score sum and the predetermined recognition score threshold, and taking the difference value as an influence score of an area with the blocked partial face features on the face recognition.

4. The method according to claim 1, wherein the acquiring a plurality of target keypoints in the plurality of detectable keypoints having a predetermined face feature association relationship with the missing keypoints based on the serial numbers of the missing keypoints when the influence score is higher than a predetermined score threshold comprises:

dividing the missing keypoints derived from the same face feature into a group when the influence score is higher than a predetermined score threshold;

searching the serial numbers of all the keypoints of the same group derived from the same face feature as the serial numbers of the missing keypoints of each group from the preset keypoint information database; and taking other keypoints with the serial numbers of the missing keypoints in each group removed from the serial numbers of all the keypoints of the same group as the target keypoints corresponding to the missing keypoints in each group.

5. The method according to claim 1, wherein the acquiring a plurality of target keypoints in the plurality of detectable keypoints having a predetermined face feature association relationship with the missing keypoints based on the serial numbers of the missing keypoints when the influence score is higher than a predetermined score threshold comprises:

searching the serial numbers of all the keypoints derived from the same face feature as the serial number of each missing keypoint from the preset keypoint information database based on the serial numbers of the missing keypoints when the influence score is higher than a predetermined score threshold; and acquiring a plurality of target keypoints from the plurality of detectable keypoints having a predetermined face feature association relationship with each missing keypoint according to the serial numbers of all the keypoints derived from the same face feature as the serial number of each missing keypoint.

6. The method according to claim 5, wherein the acquiring a plurality of target keypoints from the plurality of detectable keypoints having a predetermined face feature association relationship with each missing keypoint according to the serial numbers of all the keypoints derived from the same face feature as the serial number of each missing keypoint comprises:

searching the serial numbers of all the keypoints derived from the same face feature as the serial number of each missing keypoint from the plurality of detectable keypoints to obtain the serial numbers of the searched detectable keypoints; and taking the detectable keypoints corresponding to the serial numbers of the searched detectable keypoints as a plurality of target keypoints having a predetermined face feature association relationship with each missing keypoint.

7. The method according to claim 1, wherein the acquiring a target face feature template having a degree of position combination with the plurality of target keypoints greater than a predetermined combination degree threshold from a predetermined face feature template library according to the coordinates of the plurality of target keypoints comprises:

acquiring the coordinates of the plurality of target keypoints derived from the target human face feature according to the coordinates of each target keypoint;

calculating a first distance between each two keypoints in the plurality of target keypoints according to the coordinates of the plurality of target keypoints derived from the target face feature;

acquiring a second distance between every two keypoints of the plurality of preset keypoints having the same serial numbers as the plurality of target keypoints in a predetermined face feature template set corresponding to the target face feature from a predetermined face feature template library;

calculating a degree of position combination of the plurality of target keypoints with each template in the predetermined face feature template set according to the first distance and the second distance; and taking a template having a degree of position combination with the plurality of target keypoints greater than a predetermined combination degree threshold from the predetermined face feature template set as the target face feature template.

8. An electronic equipment, comprising a processing unit; and a storage unit configured for storing a face recognition program of the processing unit; wherein the processing unit is configured for performing the following processing via execution of the face recognition program:

detecting all keypoints from a first face image to obtain a plurality of detectable keypoints and coordinates of each detectable keypoint when receiving the first face image with blocked partial face features;

acquiring a recognition score of each detectable keypoint and serial numbers of missing keypoints from a preset keypoint information database based on each detectable keypoint;

acquiring an influence score of an area with the blocked partial face features on the face recognition according to the recognition score of each detectable keypoint;

acquiring a plurality of target keypoints in the plurality of detectable keypoints having a predetermined face feature association relationship with the missing keypoints based on the serial numbers of the missing keypoints when the influence score is higher than a predetermined score threshold;

acquiring a target face feature template having a degree of position combination with the plurality of target keypoints greater than a predetermined combination degree threshold from a predetermined face feature template library according to the coordinates of the plurality of target keypoints; and stitching the target face feature template and the plurality of target keypoints on the first face image to obtain a second face image so as to detect all the keypoints according to the second face image for performing the face recognition.

9. The electronic equipment according to claim 8, wherein the acquiring a recognition score of each detectable keypoint and serial numbers of missing keypoints from a preset keypoint information database based on each detectable keypoint comprises:

sequentially searching each detectable keypoint from a preset keypoint information database to acquire a recognition score stored in association with each detectable keypoint; and taking other keypoints except the detectable keypoints in the preset keypoint information database as the missing keypoints.

10. The electronic equipment according to claim 8, wherein the acquiring an influence score of an area with the blocked partial face features on the face recognition according to the recognition score of each detectable keypoint comprises:
- summing the recognition scores of all the detectable keypoints to obtain a recognition score sum; and
- subtracting a predetermined recognition score threshold from the recognition score sum to obtain a difference value between the recognition score sum and the predetermined recognition score threshold, and taking the difference value as an influence score of an area with the blocked partial face features on the recognized face.

11. The electronic equipment according to claim 8, wherein the acquiring a plurality of target keypoints in the plurality of detectable keypoints having a predetermined face feature association relationship with the missing keypoints based on the serial numbers of the missing keypoints when the influence score is higher than a predetermined score threshold comprises:
- dividing the missing keypoints derived from the same face feature into a group when the influence score is higher than a predetermined score threshold;
- searching the serial numbers of all the keypoints of the same group derived from the same face feature as the serial numbers of the missing keypoints of each group from the preset keypoint information database; and
- taking other keypoints with the serial numbers of the missing keypoints in each group removed from the serial numbers of all the keypoints of the same group as the target keypoints corresponding to the missing keypoints in each group.

12. The electronic equipment according to claim 8, wherein the acquiring a plurality of target keypoints in the plurality of detectable keypoints having a predetermined face feature association relationship with the missing keypoints based on the serial numbers of the missing keypoints when the influence score is higher than a predetermined score threshold comprises:
- searching the serial numbers of all the keypoints derived from the same face feature as the serial number of each missing keypoint from the preset keypoint information database based on the serial numbers of the missing keypoints when the influence score is higher than a predetermined score threshold; and
- acquiring a plurality of target keypoints from the plurality of detectable keypoints having a predetermined face feature association relationship with each missing keypoint according to the serial numbers of all the keypoints derived from the same face feature as the serial number of each missing keypoint.

13. The electronic equipment according to claim 12, wherein the acquiring a plurality of target keypoints from the plurality of detectable keypoints having a predetermined face feature association relationship with each missing keypoint according to the serial numbers of all the keypoints derived from the same face feature as the serial number of each missing keypoint comprises:
- searching the serial numbers of all the keypoints derived from the same face feature as the serial number of each missing keypoint from the plurality of detectable keypoints to obtain the serial numbers of the searched detectable keypoints; and
- taking the detectable keypoints corresponding to the serial numbers of the searched detectable keypoints as a plurality of target keypoints having a predetermined face feature association relationship with each missing keypoint.

14. The electronic equipment according to claim 8, wherein the acquiring a target face feature template having a degree of position combination with the plurality of target keypoints greater than a predetermined combination degree threshold from a predetermined face feature template library according to the coordinates of the plurality of target keypoints comprises:
- acquiring the coordinates of the plurality of target keypoints derived from the target human face feature according to the coordinates of each target keypoint;
- calculating a first distance between each two keypoints in the plurality of target keypoints according to the coordinates of the plurality of target keypoints derived from the target face feature;
- acquiring a second distance between every two keypoints of the plurality of preset keypoints having the same serial numbers as the plurality of target keypoints in a predetermined face feature template set corresponding to the target face feature from a predetermined face feature template library;
- calculating a degree of position combination of the plurality of target keypoints with each template in the predetermined face feature template set according to the first distance and the second distance; and
- taking a template having a degree of position combination with the plurality of target keypoints greater than a predetermined combination degree threshold from the predetermined face feature template set as the target face feature template.

15. A non-transitory computer readable storage medium having stored thereon a face recognition program which, when executed by a processing unit, performs the method according to claim 1.

\* \* \* \* \*